Sept. 16, 1952          S. SILVER          2,610,999

SAFETY ELECTRIC OUTLET

Filed Aug. 16, 1949

INVENTOR.
SIDNEY SILVER
BY
*Jottan H. Holashely*
ATTORNEY

Patented Sept. 16, 1952

2,610,999

UNITED STATES PATENT OFFICE 2,610,999

SAFETY ELECTRIC OUTLET

Sidney Silver, Brooklyn, N. Y.

Application August 16, 1949, Serial No. 110,563

1 Claim. (Cl. 173—330)

This invention relates to new and useful improvements in an electric outlet receptacle.

The present invention proposes the construction of an electric outlet receptacle characterized by a casing having the usual openings into which the prongs of an electric plug are to be inserted with a slide member normally closing the openings in a manner to prevent the unauthorized insertion of conductive objects other than the prongs of an electric plug, especially by very small children, with resulting damage to the electric circuit and elimination of serious burning and, in some instances, death of the child.

Another object of the present invention proposes forming the slide with a pair of slots spaced a distance equal to the spacing of the openings with a resilient means acting on the slide member to retain the same in a position in which the slots will be out of alignment with the openings preventing the insertion of unauthorized objects into the openings.

Still another object of the present invention proposes arranging the slide member so that it will have one end exposed at one side of the casing to be urged inward against the action of the resilient means to align the slots of the slide member with the openings to permit the insertion of prongs of the plug when desired.

A still further object of the present invention proposes constructing the casing so that all of the operative parts of the slide members are mounted directly on the casing which has an open back closed by means of a plate which is to be secured to a support wall or other structure.

The present invention further proposes a novel means for releasably securing the casing to the plate which closes the back of the casing so that the casing can be separated from the plate for access to the interior thereof without the use of tools.

It is a further object of the present invention to construct an electric outlet receptacle which is simple and durable and which can be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawing forming a material part of the present disclosure:

Figure 1:
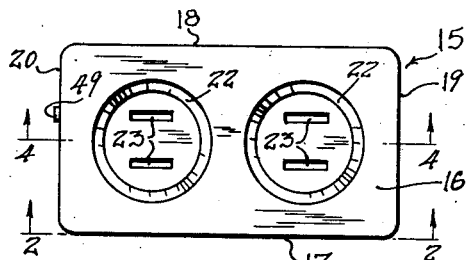
Fig. 1 is a front elevational view of the electric outlet receptacle constructed in accordance with the present invention.
Figure 3:
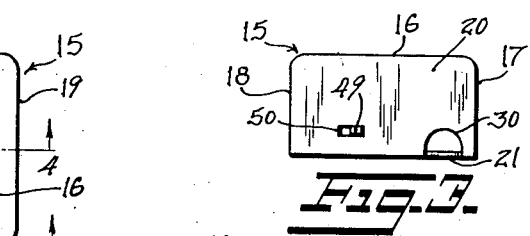
Fig. 3 is an end elevational view looking from the left hand side of Fig. 2.
Figure 2:
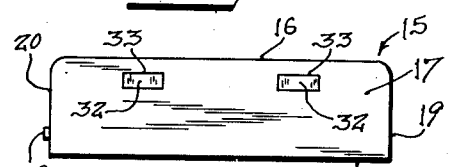
Fig. 2 is a side elevational view looking in the direction of the line 2—2 of Fig. 1.

The electric outlet receptacle, according to the present invention, includes a casing 15 having a top or front wall 16, side walls 17 and 18, end walls 19 and 20 and an open back closed by means of a plate 21. The exposed face of the top or front wall 16 is formed with spaced recesses 22. Within each of the recesses 22 there is formed a pair of spaced openings 23 through which the spaced prongs of a conventional electric plug, not shown, can be inserted as is generally known in the art.

Figure 6:
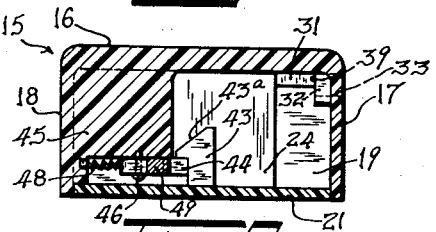
Fig. 6 is a transverse vertical sectional view taken on the line 6—6 of Fig. 4.
Figure 7:
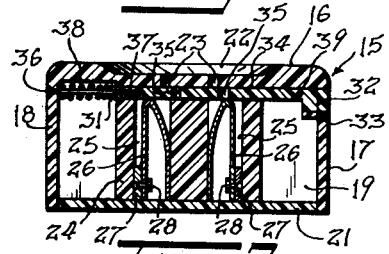
Fig. 7 is a transverse vertical sectional view taken on the line 7—7 of Fig. 4.
Figure 5:
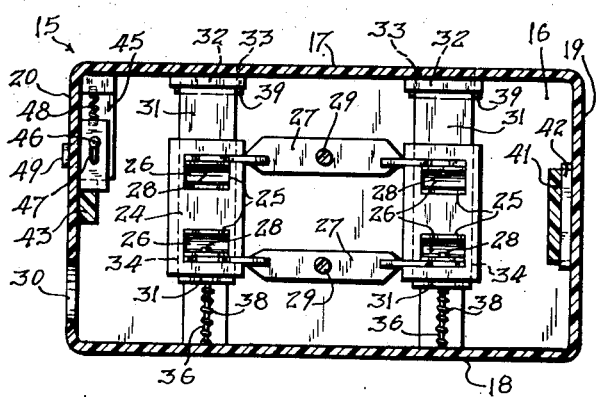
Fig. 5 is a horizontal sectional view taken on the line 5—5 of Fig. 4.
Figure 9:
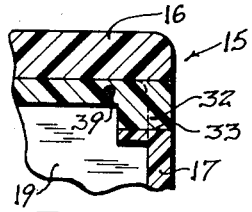
Fig. 9 is an enlarged detailed view of another portion of Fig. 7.
Figure 10:
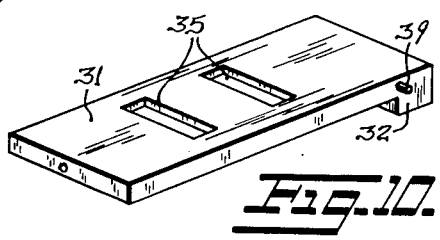
Fig. 10 is an enlarged perspective view of one of the slide members, per se.

Within the casing 15 there is formed a spaced pair of projections 24, one in alignment with each of the pair of openings 23. Each of the projections 24 is formed with a pair of cavities 25, see particularly Figs. 5 to 7. The construction is such that each of the openings 23 is in direct communication with one of the cavities. Within each of the cavities 25 there is a metallic conductor strip 26 of substantially inverted V-shape. Extended between the projections 24 there is a pair of parallel metallic conductor members 27. Each of the conductor members has one of its ends secured to one of the conductor strips 26 of each pair by means of a rivet 28. Mounted on each of the conductor members 27, intermediate of its ends there is small screw 29 which is to be used to connect the bared ends of a length of electric wire to the conductor members 27, as is generally known in the art. The end wall 20 of the casing 15 is formed with the usual notch 30 through which the electric wire is adapted to enter the casing 15. The prongs of the electric plug when inserted into the openings 23 will project into the cavities 25 and make electrical contact with the respective conductor strips 26.

Means is provided in connection with each pair of openings 23 for closing the openings so as to prevent small children from poking metal objects or other conductive articles into the openings and making contact with the conductor strips 26 with a resulting short circuit and possible burning of the child and even death, in some instances. That means is comprised of a pair of slide members 31 of non-conductive material formed at one of their ends with enlarged finger engaging portions 32. The side wall 17 in alignment with each of the projections 24 is formed with an opening 33 and the projections 24 between the openings 23 and the cavities 25 are formed with passages 34. The ends of the slide members 31, opposite the enlarged finger engaging portions 32, are passed through the openings 33 and through the passages 34 so that the slide members 31 will close the openings 23 and prevent the prongs of the plug from being passed therethrough to make electrical contact with the conductor strips 26. Each of the slide members 31 is formed with a pair of slots 35 spaced from each other a distance equal to the spacing of the openings 23.

Resilient means is provided for retaining the slide members 31 in positions in which the slots 35 will be out of alignment with the openings 23. The resilient means comprises a pin, for each of the slide members 31, which is mounted fixedly in position through the side wall 18 and which has its inner end freely projected into a complementary hole 37 formed in the adjacent end of the respective slide member 31. Expansion springs 38 are coaxially mounted on the pins 36 and operate between the inside face of the side wall 18 and the adjacent end of the respective slide member 31 urging the slide members into positions in which the respective slots 35 will be out of alignment with the respective openings 23. Mounted across the slide members 31 adjacent the finger engaging portions 32 there are elongated pegs 39. As shown in Figs. 5 to 7, 9 and 10, the ends of the pegs 39 project beyond the sides of the slide members 31 and engage the inner face of the side walls 17 limiting the action of the springs 38 in urging the slide members 31 outward and so hold the slide members in positions in which the outer faces of the finger engaging portions 32 will be flush with the outer face of the side wall 17.

When it is desired to insert the prongs of an electric plug, it is merely necessary to press inward on the exposed face of the finger engaging portion 32 of the respective slide member 31, against the action of the respective spring 38, which causes the slots 35 of that slide member 31 to be aligned with the openings 23. The prongs of the plug can then be passed through the openings 23, the slots 35 and into the cavities 25 to make electrical contact with the conductor strips 26. As long as the prongs are extended into the cavities 25 the slide member 31 will be retained against outward movement by the spring 38. However, the moment the prongs of the plug are withdrawn, the slide member 31 is free to be moved outward by the expansion springs 38 until the projecting ends of the peg 39 strike the inner face of the side wall 17. In that position the slots 35 of the slide member 31 will be out of alignment with the openings 23 preventing the unauthorized insertion of metallic conductive articles into the openings 23.

Figure 4:
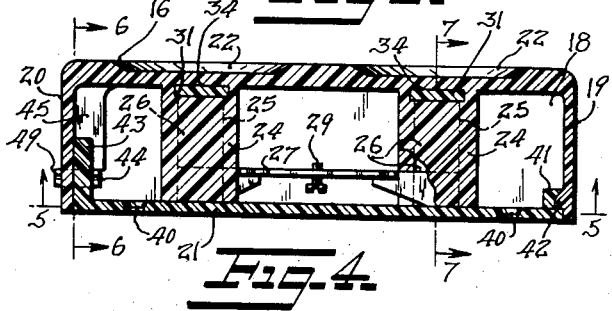
Fig. 4 is an enlarged longitudinal vertical sectional view taken on the line 4—4 of Fig. 1.
Figure 8:
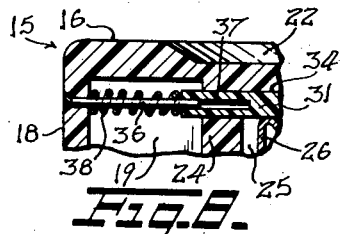
Fig. 8 is an enlarged detailed view of a portion of Fig. 7.

Both the casing 15 and the plate 21 are formed of a non-conductive material and on the drawing, those parts are illustrated as being molded of a resinous plastic material. However, the showing is by way of illustration only as those parts could be molded or fashioned of any desired non-conductive material. The plate 21 is shown provided with a pair of spaced holes 40, see Fig. 4, through which screws or the like, not shown, can be passed for securing the plate 21 to a wall or other support.

The plate 21 is of a size to fit snugly within the open back of the casing 15, and means is provided for releasably retaining the casing 15 on the plate 21. The releasable retaining means is comprised of a small hook 41 integrally formed with one end of the plate 21 and which is engageable with a complementary lug 42 formed on the inner face of the adjacent end wall 19.

At the other end, the plate 21 is formed with an upstanding latch element 43 engageable with a complementary keeper element 44 slidable on the end wall 20 of the casing 15. The keeper element 44 is slidably retained in position upon a support member 45 by means of a pin 46 which passes through an elongated slot 47 formed in the keeper element 44. A small expansion spring 48 operates between the keeper element 44 and a part of the support member 45 urging the keeper element 44 in a direction to engage the latch element 43.

The side of the keeper element 44 adjacent the end wall 20, is formed with a laterally extending lug 49. The lug 49 projects through an elongated slot 50 formed in the end wall 20, as shown in Figs. 1 to 5, to be used to urge the keeper element 44 against the action of the spring 48 to free the latch element 43 so that the casing 15 can be removed from the plate 21. The top of the latch element 43 is formed with an inclined cam surface 43ª, see Fig. 6, which is to strike the keeper element 44 when the casing 15 is pressed into position on the plate 21, and urge it, against the action of the spring 48, so that the latch element 43 can pass the keeper element 44 when the casing 15 is being returned to its position mounted on the plate 21.

On the drawing, the novel features of the present invention are shown applied to an outlet receptacle of the duplex type, but those features could be equally well applied to a receptacle of the simplex or triplex type or a receptacle embodying four, five or six outlets, without departing from the scope and intent of the present invention.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

In an electric outlet receptacle, a casing enclosing a pair of spaced conductor strips, said casing having a front wall formed with a pair of spaced openings aligned with the conductor strips through which the prongs of an electric plug can be passed to contact the conductor strips, a slide member slidably positioned within said casing adjacent the front wall and formed with a pair of slots spaced a distance corresponding to the spacing of the spaced openings of the front wall, resilient means urging said slide member into a position in which said slots will be disaligned from the spaced openings, said slide member having one end exposed at one side of the casing by which said slide member can be pushed against the action of said resilient means to align said slots with the openings permitting the prongs of the plug to be inserted into the openings when desired, said one end of said slide member being formed with an enlarged finger engaging portion exposed at the said one side of the casing by which the slide member can be slid inward against the action of said resilient means to align said slots with the openings, and a peg mounted across the end of said slide member adjacent said enlarged finger engaging portion, said peg having its ends projected beyond the sides of said slide to engage the inner face of the said one wall of the casing when said slide member is urged by said resilient means to limit the action of said resilient means in urging said slide member to a position in which the outer face of said enlarged finger engaging portion is flush with the outer face of the said one wall of the casing.

SIDNEY SILVER.

REFERENCES CITED

The following references are of record in the file of this patent:

UNITED STATES PATENTS

| Number | Name | Date |
| --- | --- | --- |
| 1,020,437 | Nelson | Mar. 19, 1912 |
| 1,779,327 | Moss | Oct. 12, 1930 |
| 2,154,160 | Hamilton | Apr. 11, 1939 |
| 2,477,803 | Huber | Aug. 2, 1949 |
| 2,510,745 | Kilgore | June 6, 1950 |
| 2,552,061 | Popp | May 8, 1951 |

FOREIGN PATENTS

| Number | Country | Date |
| --- | --- | --- |
| 463,915 | England | Apr. 8, 1937 |
| 732,287 | France | June 14, 1932 |